(12) United States Patent
Royer et al.

(10) Patent No.: US 11,391,218 B2
(45) Date of Patent: Jul. 19, 2022

(54) METHOD AND SYSTEM FOR SETTING POWER OF AN AIRCRAFT ENGINE

(71) Applicant: PRATT & WHITNEY CANADA CORP., Longueuil (CA)

(72) Inventors: Jean-Philippe Royer, Boucherville (CA); Eric Martel, La Prairie (CA); Daniel D'Anjou, Longueuil (CA); James Jarvo, Saint-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 451 days.

(21) Appl. No.: 16/361,755

(22) Filed: Mar. 22, 2019

(65) Prior Publication Data
US 2020/0300176 A1    Sep. 24, 2020

(51) Int. Cl.
*F02C 9/00*    (2006.01)
*F02C 3/06*    (2006.01)

(52) U.S. Cl.
CPC ...... *F02C 9/00* (2013.01); *F02C 3/06* (2013.01)

(58) Field of Classification Search
CPC ...... F02C 9/00; F02C 3/06; F02C 9/28; F02C 9/285; F02C 9/42; F02C 6/20; B64D 31/06; B64D 31/04; B64D 27/10; B64D 31/14; B64D 31/02; G08G 5/0021; G08G 5/0047; B29C 2035/0822; B29C 35/0266; B29C 44/022; B29C 44/3415; B29K 2105/04; B29K 2105/048; B32B 27/10; B32B 29/002; B41M 3/06; B41M 5/385; B41M 5/392; B41M 7/009; B60W 2710/0666; B64C 11/34; B64C 11/40; F02K 9/80; F02K 3/065; F05D 2270/051; F05D 2220/329; F05D 2260/80; F05D 2260/83; F05D 2270/053; F05D 2270/093; G01C 23/00; G01D 9/005; G01R 31/008; G05D 1/0072; G05D 1/0202; G05D 1/0607;
(Continued)

(56) References Cited

U.S. PATENT DOCUMENTS 3,356,152 A * 12/1967 Accorsi ................. B64C 11/305
                                                                  416/49
5,006,993 A *  4/1991 Virnig ........................ F02C 9/42
                                                                  701/99
(Continued)

FOREIGN PATENT DOCUMENTS

CA        2782105 A1 *  1/2013 ............. G06Q 10/04
WO    WO-2015076888 A2 *  5/2015 ........... G05D 1/0072

OTHER PUBLICATIONS

Extended European Search Report dated Aug. 11, 2020, in connection with counterpart European patent application No. 20164828.4.

*Primary Examiner* — Bhavesh V Amin
(74) *Attorney, Agent, or Firm* — Norton Rose Fulbright Canada LLP (57) ABSTRACT

Methods and systems for setting a target power of an aircraft engine are described herein. A power lever position is obtained. At least one flight condition indicative of a phase of flight of the aircraft is obtained. A maximum rated power of the engine is determined for one or more engine rating based on the phase of flight. The target power of the engine is set based on the power lever position and the maximum rated power of the one or more engine ratings.

20 Claims, 9 Drawing Sheets

(58) Field of Classification Search
CPC ...... G05D 1/0661; G05D 1/101; Y02T 50/60;
Y02T 50/671; Y10S 244/904; Y10T
428/24802; Y10T 428/24934
See application file for complete search history.

(56) References Cited

U.S. PATENT DOCUMENTS

| | | | | |
|---|---|---|---|---|
| 5,029,778 | A * | 7/1991 | DeLuca | B64D 31/02 244/175 |
| 5,050,081 | A * | 9/1991 | Abbott | G05D 1/0072 701/14 |
| 5,070,458 | A * | 12/1991 | Gilmore | G05D 1/0005 702/182 |
| 5,136,841 | A * | 8/1992 | Zimmerman | G05D 1/0077 60/233 |
| 5,299,765 | A * | 4/1994 | Blechen | G05D 1/0661 244/188 |
| 5,823,479 | A * | 10/1998 | Nield | G05D 1/0808 701/16 |
| 5,893,040 | A * | 4/1999 | Gunn | G05D 1/0607 73/112.04 |
| 6,053,737 | A * | 4/2000 | Babbitt | G09B 9/08 434/30 |
| 6,282,882 | B1 * | 9/2001 | Dudd, Jr. | F02C 9/28 60/790 |
| 6,311,106 | B1 * | 10/2001 | Dupont | G01G 19/07 244/6 |
| 6,468,035 | B1 * | 10/2002 | Otake | B64C 11/305 416/37 |
| 6,628,995 | B1 | 9/2003 | Korson et al. | |
| 6,823,675 | B2 * | 11/2004 | Brunell | G05B 23/0291 60/773 |
| 6,880,784 | B1 * | 4/2005 | Wilkinson | G05D 1/0661 244/76 R |
| 6,894,611 | B2 * | 5/2005 | Butz | F02C 9/00 701/1 |
| 7,212,942 | B2 * | 5/2007 | Vollum | G01L 3/24 702/127 |
| 7,471,996 | B2 | 12/2008 | Bartel | |
| 7,532,970 | B1 * | 5/2009 | Lardillon | F02C 9/28 702/182 |
| 7,930,075 | B2 * | 4/2011 | Alcantara | G05D 1/0661 701/15 |
| 8,025,503 | B2 * | 9/2011 | Gates | G09B 9/46 434/33 |
| 8,068,997 | B2 * | 11/2011 | Ling | G05B 23/0254 702/41 |
| 8,175,763 | B2 * | 5/2012 | Yamane | B64C 13/18 701/16 |
| 8,259,208 | B2 * | 9/2012 | Ciurea | G06F 3/0488 345/173 |
| 8,359,129 | B2 * | 1/2013 | Lemaignan | B64D 31/10 340/963 |
| 8,447,441 | B2 * | 5/2013 | Calvignac | G06F 7/00 700/286 |
| 8,493,240 | B1 | 7/2013 | Carrico | |
| 8,615,335 | B2 * | 12/2013 | Couey | F02C 9/28 244/188 |
| 8,626,362 | B2 * | 1/2014 | Freissinet | G05D 1/0202 244/76 R |
| 8,657,227 | B1 * | 2/2014 | Bayliss | B64D 13/00 244/58 |
| 8,670,881 | B2 * | 3/2014 | DeJonge | G05D 1/0661 701/5 |
| 8,762,024 | B2 * | 6/2014 | Fernandez | B64D 31/12 701/99 |
| 8,825,227 | B2 * | 9/2014 | Saint-Marc | B64D 31/00 701/4 |
| 8,838,295 | B2 * | 9/2014 | Moune | B64C 19/00 701/3 |
| 9,002,616 | B2 * | 4/2015 | Genevrier | F02C 9/28 701/31.7 |
| 9,096,325 | B2 * | 8/2015 | Oltheten | F02C 9/42 |
| 9,359,065 | B2 * | 6/2016 | Moser | B64C 13/0425 |
| 9,458,771 | B2 * | 10/2016 | Ling | F02C 9/28 |
| 9,472,107 | B2 | 10/2016 | Lissajoux et al. | |
| 9,481,472 | B2 * | 11/2016 | Moune | B64C 13/506 |
| 9,567,097 | B2 * | 2/2017 | Horsager | G05D 1/0005 |
| 9,587,512 | B1 * | 3/2017 | Skilton | F01D 21/003 |
| 9,732,625 | B2 * | 8/2017 | Cai | F01D 21/003 |
| 9,909,510 | B2 * | 3/2018 | Poth, Jr. | F02C 9/16 |
| 10,040,565 | B2 | 8/2018 | Looper et al. | |
| 10,118,711 | B2 * | 11/2018 | Consola | B64D 31/06 |
| 10,487,752 | B2 * | 11/2019 | Fiedler | F01D 21/02 |
| 10,683,099 | B2 * | 6/2020 | Lisio | B64D 35/00 |
| 10,760,484 | B2 * | 9/2020 | Alecu | F02C 6/20 |
| 10,864,994 | B2 * | 12/2020 | Alaimo, Jr. | F02C 9/00 |
| 10,946,973 | B2 * | 3/2021 | Riley | G06F 12/08 |
| 10,956,534 | B2 * | 3/2021 | Ling | G05B 23/024 |
| 2002/0092948 | A1 * | 7/2002 | Dugan | B64D 33/06 244/53 R |
| 2002/0133322 | A1 * | 9/2002 | Williams | G09B 9/46 703/8 |
| 2002/0165696 | A1 * | 11/2002 | Bond | B64D 41/00 702/183 |
| 2003/0125906 | A1 * | 7/2003 | Guaglardi | G05B 23/0251 702/182 |
| 2004/0123600 | A1 * | 7/2004 | Brunell | F02C 9/00 60/773 |
| 2004/0215375 | A1 * | 10/2004 | Andre | G01D 3/024 701/14 |
| 2004/0267414 | A1 * | 12/2004 | Bartel | F02C 9/28 701/4 |
| 2005/0222822 | A1 * | 10/2005 | Muramatsu | F01D 17/02 73/112.01 |
| 2006/0251507 | A1 * | 11/2006 | Braswell | F01D 17/20 415/13 |
| 2007/0012044 | A1 * | 1/2007 | Osborn | G05B 23/0232 60/803 |
| 2007/0079593 | A1 * | 4/2007 | Fujii | F02C 9/28 60/39.27 |
| 2008/0029653 | A1 * | 2/2008 | Johnson | F02C 9/28 244/175 |
| 2008/0243315 | A1 * | 10/2008 | Ferro | G01C 23/00 701/7 |
| 2008/0243318 | A1 * | 10/2008 | Ferro | G05D 1/0072 701/410 |
| 2009/0072080 | A1 * | 3/2009 | Bhargava | B64C 25/405 244/58 |
| 2009/0132106 | A1 * | 5/2009 | DeJonge | G05D 1/0661 701/15 |
| 2009/0132107 | A1 * | 5/2009 | DeJonge | G05D 1/0661 701/15 |
| 2010/0083632 | A1 * | 4/2010 | Foster | F01D 15/10 60/39.181 |
| 2010/0094486 | A1 * | 4/2010 | Joyeux | G08G 5/0021 701/9 |
| 2010/0281875 | A1 * | 11/2010 | Price | F02C 3/107 60/785 |
| 2010/0287905 | A1 | 11/2010 | Shepler | |
| 2010/0305825 | A1 * | 12/2010 | Fernandez | B64D 31/04 701/99 |
| 2011/0057071 | A1 * | 3/2011 | Sahasrabudhe | G05D 1/0858 244/17.13 |
| 2011/0077858 | A1 * | 3/2011 | Coulmeau | G08G 5/0039 701/465 |
| 2011/0093141 | A1 * | 4/2011 | Alcantara | G05D 1/0661 701/15 |
| 2011/0118908 | A1 * | 5/2011 | Boorman | G08G 5/0021 701/14 |
| 2011/0184623 | A1 * | 7/2011 | De Boer | B64D 31/12 701/99 |
| 2011/0251740 | A1 * | 10/2011 | Gomez Ledesma | G05D 1/101 701/8 |
| 2011/0301822 | A1 * | 12/2011 | Aurousseau | F02C 9/52 60/773 |
| 2012/0053811 | A1 * | 3/2012 | Dyrla | F01D 21/14 60/773 |

(56) References Cited

U.S. PATENT DOCUMENTS

| | | | | |
|---|---|---|---|---|
| 2012/0130617 A1* | 5/2012 | Raimarckers | F01D 21/003 | 701/99 |
| 2013/0066487 A1* | 3/2013 | Holder | G08G 5/0021 | 701/14 |
| 2013/0158680 A1* | 6/2013 | Fuller | G05B 13/048 | 700/29 |
| 2013/0184958 A1* | 7/2013 | Dyrla | G05D 1/0005 | 701/99 |
| 2013/0199204 A1* | 8/2013 | Camhi | G05B 23/0221 | 60/779 |
| 2013/0221164 A1* | 8/2013 | Klooster | G05D 1/0607 | 244/180 |
| 2013/0238173 A1* | 9/2013 | Burns | G08G 5/0021 | 701/15 |
| 2013/0268146 A1* | 10/2013 | Baudry | G06F 3/011 | 701/3 |
| 2014/0200844 A1* | 7/2014 | Evrard | B64C 27/04 | 702/130 |
| 2014/0236534 A1* | 8/2014 | Ling | G06F 17/00 | 702/182 |
| 2014/0244051 A1* | 8/2014 | Rollins | F04D 25/0606 | 700/282 |
| 2014/0271117 A1* | 9/2014 | Armstrong | F02C 9/00 | 415/13 |
| 2014/0283527 A1* | 9/2014 | Ling | F02C 9/28 | 60/793 |
| 2014/0309821 A1* | 10/2014 | Poux | G08G 5/0021 | 701/14 |
| 2015/0073648 A1* | 3/2015 | Gu | F01D 17/20 | 701/29.5 |
| 2015/0083850 A1* | 3/2015 | Moser | B64C 13/0425 | 244/99.2 |
| 2015/0120098 A1* | 4/2015 | Catalfamo | G08G 5/0021 | 701/16 |
| 2015/0275767 A1* | 10/2015 | Poth, Jr. | F02C 9/26 | 700/287 |
| 2015/0284103 A1* | 10/2015 | Swann | F02C 9/00 | 701/3 |
| 2015/0323933 A1* | 11/2015 | Darbois | G05D 1/0005 | 701/4 |
| 2015/0364046 A1* | 12/2015 | Lissajoux | G08G 5/0047 | 701/3 |
| 2015/0375853 A1* | 12/2015 | Kawalkar | B64D 31/06 | 244/50 |
| 2016/0167799 A1* | 6/2016 | Smaoui | B60K 6/442 | 701/16 |
| 2016/0207633 A1* | 7/2016 | McWaters | B64D 27/10 | |
| 2016/0208639 A1* | 7/2016 | Cai | F01D 17/06 | |
| 2016/0318601 A1* | 11/2016 | Arnold | B64C 13/343 | |
| 2017/0152054 A1* | 6/2017 | Consola | B64D 31/06 | |
| 2017/0211485 A1* | 7/2017 | Tramontin | F02C 9/20 | |
| 2018/0222596 A1* | 8/2018 | Lisio | B64D 27/10 | |
| 2018/0301937 A1* | 10/2018 | Park | H02J 50/60 | |
| 2018/0354630 A1* | 12/2018 | Nakhjavani | G06N 3/084 | |
| 2019/0329577 A1 | 1/2019 | Cipolla et al. | | |
| 2020/0002018 A1* | 1/2020 | Alaimo, Jr. | B64D 31/14 | |
| 2020/0277064 A1* | 9/2020 | Thomassin | B64D 43/00 | |
| 2020/0300176 A1* | 9/2020 | Royer | F02C 3/06 | |
| 2021/0108578 A1* | 4/2021 | Darfeuil | F02C 6/20 | |
| 2021/0371116 A1* | 12/2021 | Cartwright | B60L 50/60 | |

* cited by examiner

METHOD AND SYSTEM FOR SETTING POWER OF AN AIRCRAFT ENGINE

TECHNICAL FIELD

The present disclosure relates generally to engines, and more particularly to control of aircraft engines.

BACKGROUND OF THE ART

During aircraft flight a pilot selects an engine rating (e.g., a maximum take-off power engine rating, a maximum continuous power engine rating, a maximum cruise power engine rating, etc.). Each engine rating corresponds to a predetermined maximum rated power for the engine, which is a value that is used to govern the output power of the engine. Some engine ratings may be appropriate for more than one phase of flight (e.g., take-off, climb, go-around, cruise, descent, etc.). For example, the maximum continuous power engine rating could be selected by the pilot either in climb or cruise. However, using a given predetermined engine rating in more than one phase of flight can result in certain inefficiencies in the performance and operation of the engine.

As such, there is a need for improvement.

SUMMARY

In one aspect, there is provided a method for setting a target power of an aircraft engine. The method comprises obtaining a power lever position, obtaining at least one flight condition parameter indicative of a phase of flight of the aircraft, determining a maximum rated power of the engine for one or more engine ratings based on the phase of flight, and setting the target power of the engine based on the power lever position and the maximum rated power of the one or more engine ratings.

In another aspect, there is provided a system for setting a target power of an aircraft engine. The system comprising at least one processing unit, and at least one non-transitory computer-readable memory having stored thereon program instructions. The program instructions are executable by the at least one processing unit for obtaining a power lever position, obtaining at least one flight condition parameter indicative of a phase of flight of the aircraft, determining a maximum rated power of the engine for one or more engine ratings based on the phase of flight, and setting the target power of the engine based on the power lever position and the maximum rated power of the one or more engine ratings.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
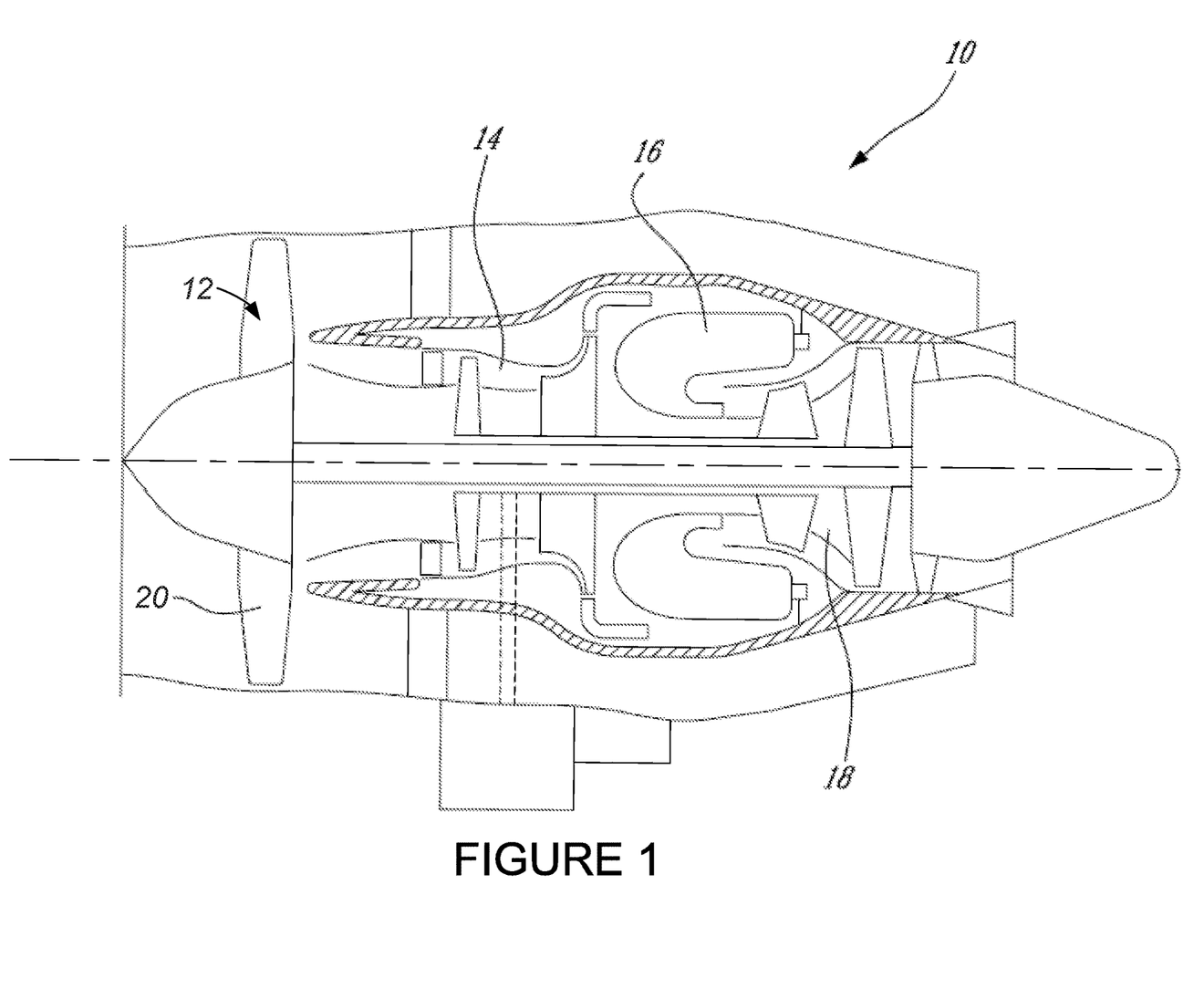
FIG. 1 is a schematic of an example gas turbine engine, in accordance with one or more embodiments.

FIG. 1 illustrates a gas turbine engine 10 that may be controlled using the methods and systems described herein. Engine 10 generally comprises in serial flow communication: a fan rotor 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan rotor 12 comprises a plurality of fan blades 20. It should be understood that while the engine 10 is a turbofan engine, the methods and systems described herein may be applicable to any other type of gas turbine engine, such as a turboprop, turboshaft or any other suitable aircraft engine.

Figure 2A:
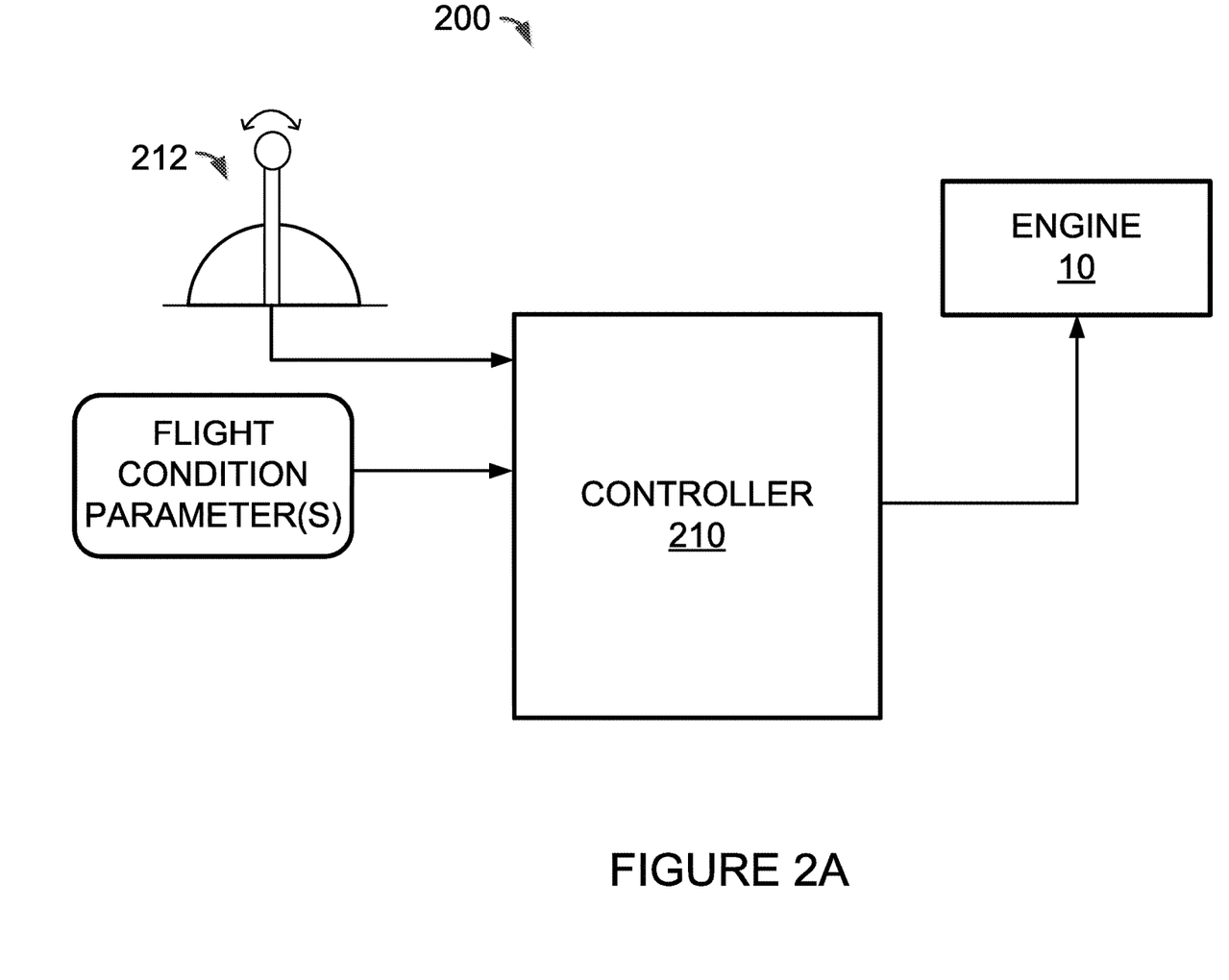
FIG. 2A is a schematic diagram illustrating a system for setting a target power of an aircraft engine, in accordance with one or more embodiments.

With reference to FIG. 2A, there is illustrated a system 200 for setting a target power of an aircraft engine, such as engine 10, in accordance with some embodiments. As illustrated, an electronic engine controller 210 may be used to control the engine 10. While the controller 210 is illustrated as separate from the engine 10, it should be understood that this is for illustrative purposes only and that the controller 210 may, in some embodiments, be integrated with the engine 10.

The controller 210 is configured to obtain a position of a power lever 212 (referred to herein as the "power lever position"). The power lever position may be received directly from the power lever 212, may be received by an aircraft or engine computer, or may be received via any other aircraft and/or engine component. One or more sensors associated with the power lever 212 may be used to obtain the power lever position and provide the power lever position to the controller 210.

The controller 210 is configured to obtain at least one flight condition parameter that is indicative of a phase of flight of the aircraft. The flight condition parameter(s) may comprise one or more of altitude, speed, rate of climb, acceleration, pitch angle, roll angle, and yaw angle of the aircraft. The aircraft altitude may be pressure altitude or ambient pressure. The aircraft speed may be Mach number, calibrated airspeed or true airspeed. The rate of climb corresponds to a change of the aircraft altitude over time. In some embodiments, the controller 210 may determine the rate of climb from the aircraft altitude, rather than receiving the rate of climb parameter. The flight condition parameter(s) may be received from one or more sensors associated with the aircraft or the engine 10 or may be received by an aircraft or engine computer. In accordance with an embodiment, the controller 210 determines the phase of flight of the aircraft from the obtained flight condition parameter(s). In alternative embodiments, the controller 210 receives the phase of flight from an aircraft or engine computer. The phase of flight may correspond to one of take-off, climb, go-around, cruise, descent and landing of the aircraft. The phase of flight may correspond to a transition between two of take-off, climb, go-around, cruise, descent and landing of the aircraft.

The controller 210 is configured to determine a maximum rated power of the engine 10 for one or more engine ratings based on the phase of flight of the aircraft. In some embodiments, the controller 210 determines the maximum rated power of the engine for one engine rating. In some embodiments, the controller 210 determines the maximum rated power of the engine 10 for a plurality of engine ratings. The engine ratings may comprise one or more of a maximum take-off power engine rating, a maximum continuous power engine rating, a maximum climb power engine rating, a maximum cruise power engine rating, a normal take-off power engine rating, a normal climb power engine rating, and a normal cruise power engine rating. The controller 210 may continuously determine the maximum rated power of the engine 10 for the engine rating(s) in real time, or in accordance with any suitable time interval that is regular or irregular. For example, the controller 210 may detect that the phase of flight has changed and re-determine the maximum rated power of the engine 10 for the engine rating(s). Thus, as the phase of flight varies, the maximum rated power of the engine 10 for the engine rating(s) accordingly varies. In some embodiments, the controller 210 may output maximum rated power of the engine rating(s) to an aircraft computer for displaying of the maximum rated power. In some embodiments, the maximum rated power of the engine rating(s) may be used by the controller 210 for controlling of the engine 10 in other aspects such as, but not limited to, engine limits and surge protection.

The controller 210 is configured to set the target power of the engine 10 based on the power lever position and the maximum rated power of the one or more engine ratings that were determined based on phase of flight. In some embodiments, the controller 210 is configured to determine a target power versus power lever position schedule (or curve) based on the maximum rated power of the engine rating(s). The controller 210 may then be configured to obtain the target power of the engine 10 from the schedule based on the power lever position. The controller 210 may implement one or more functions, algorithms, or any other suitable logic to determine the target power based on the power lever position and the maximum rated power of the one or more engine ratings.

It should be appreciated that by determining the maximum rated power for one or more engine ratings based on phase of flight, the corresponding power setting of the engine varies with phase of flight, which may result in improved engine operation and/or performance.

Figure 2B:
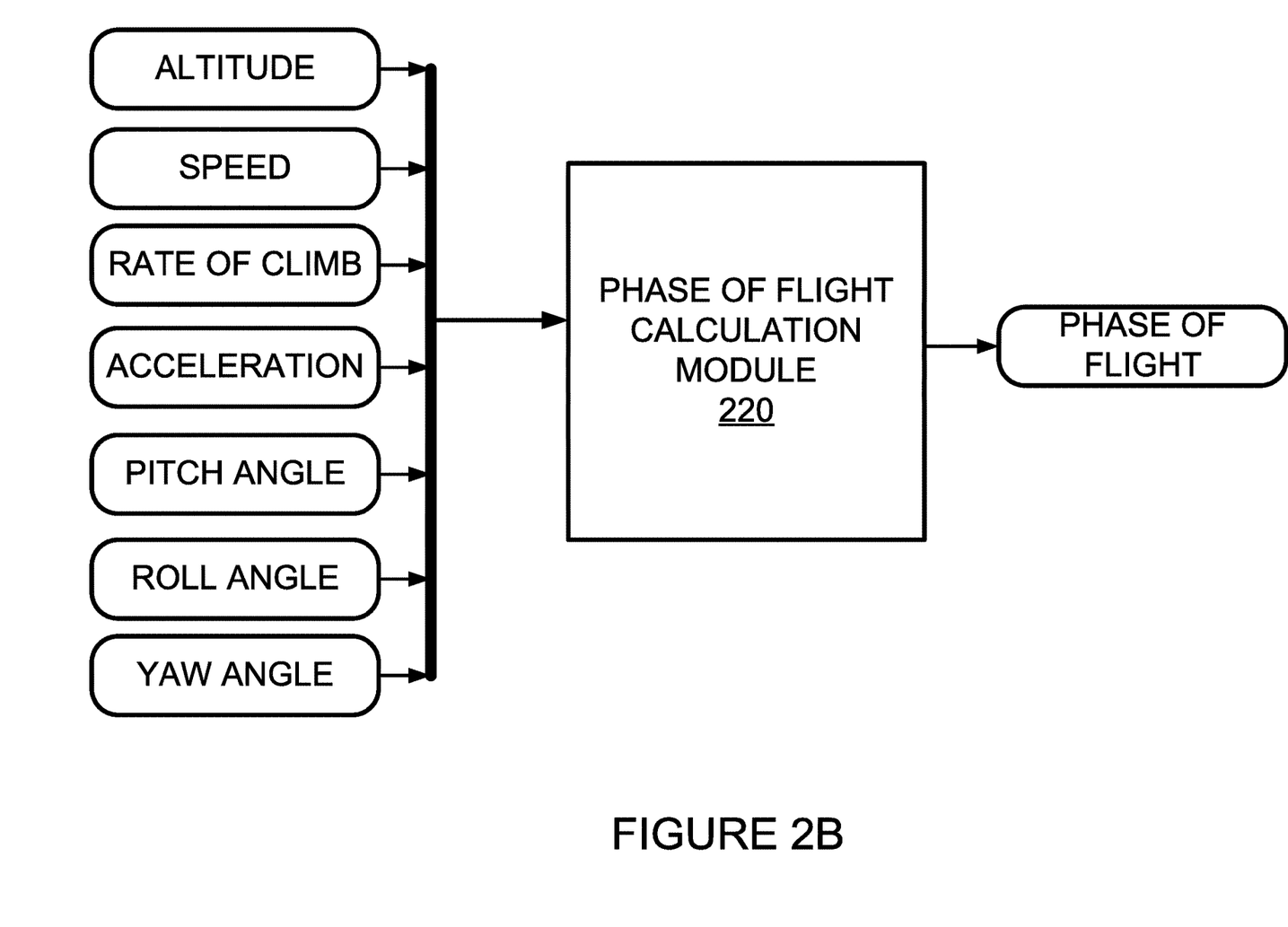
FIG. 2B is a schematic diagram illustrating a phase of flight calculation module, in accordance with one or more embodiments.

With reference to FIG. 2B, there is illustrated a phase of flight calculation module 220 of the controller 210, in accordance with an embodiment. The phase of flight calculation module 220 determines the phase of flight of the aircraft from obtained flight condition parameters. In the specific and non-limiting example illustrated in FIG. 2B, the phase of flight calculation module 220 determines the phase of flight of the aircraft from altitude, speed, rate of climb, acceleration, pitch angle, roll angle, and yaw angle of the aircraft. The flight condition parameters used by the phase of flight calculation module 220 to determine the phase of flight of the aircraft may vary depending on practical implementations. For instance, one or more of the flight condition parameters illustrated in FIG. 2B may be omitted and/or one or more additional flight condition parameters not illustrated in FIG. 2B may be used to determine the phase of flight. The phase of flight calculation module 220 implements one or more functions, algorithms, or any other suitable logic to determine the phase of flight of the aircraft from the flight condition parameter(s).

Figure 2C:
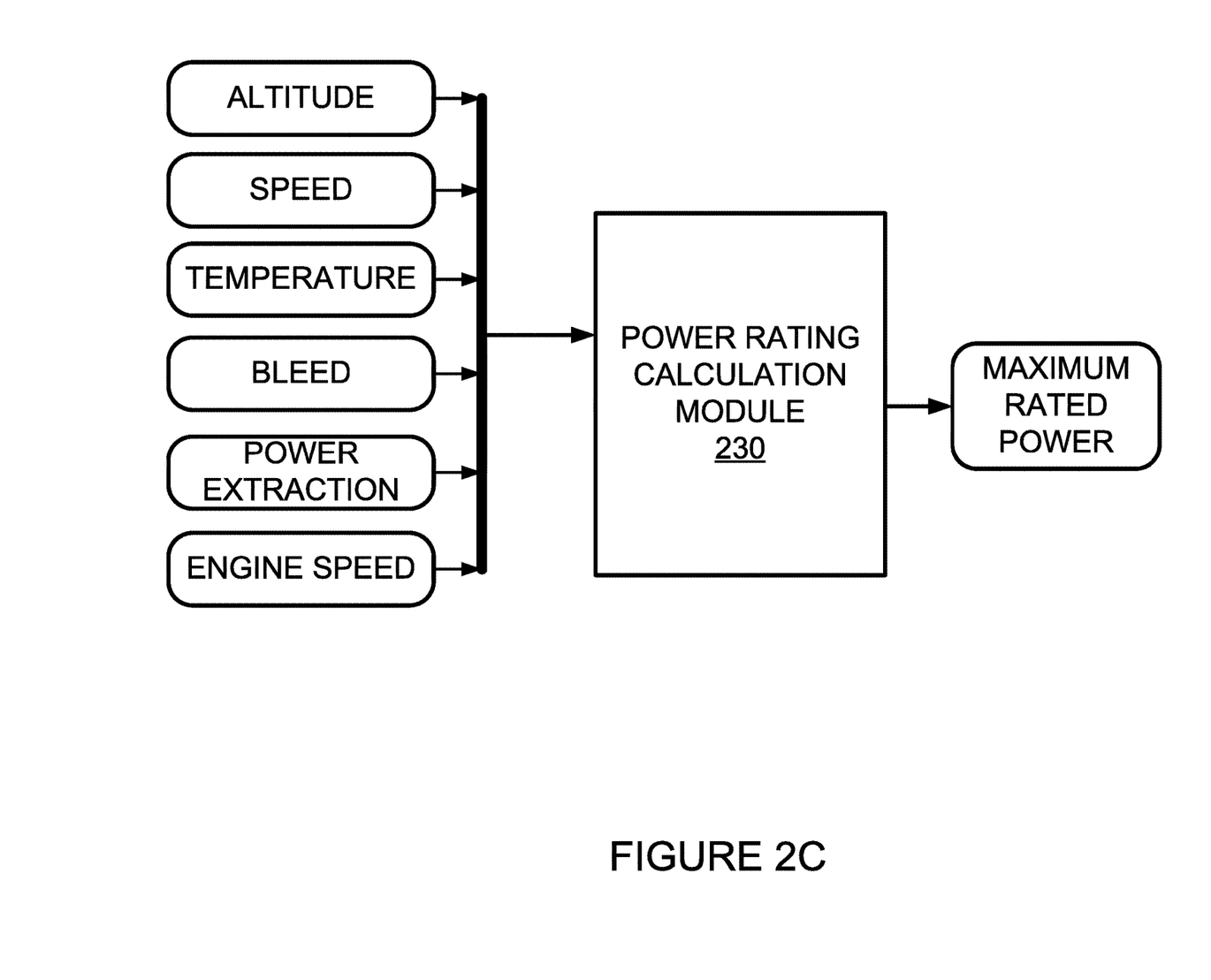
FIG. 2C is a schematic diagram illustrating a power rating calculation module, in accordance with one or more embodiments.

With reference to FIG. 2C, there is illustrated a power rating calculation module 230 of the controller 210, in accordance with an embodiment. The power rating calculation module 230 determines the maximum rated power of the engine 10 for the one or more engine ratings for a specific phase of flight of the aircraft based on one or more aircraft and/or engine parameters. The aircraft and/or engine parameters may comprise one or more of aircraft altitude, aircraft speed, aircraft air temperature (e.g., static outside air temperature or total air temperature), engine bleed (e.g., engine compressor output bleed or inter-stage bleed), engine power extraction(s) (e.g., auxiliary gearbox or reduction gearbox extractions), engine rotational speed (e.g., engine power turbine speed) or any other suitable parameters. The controller 210 may obtain the aircraft and/or engine parameters from one or more sensors associated with the aircraft and/or the engine 10 and/or may be received by an aircraft and/or engine computer. The power rating calculation module 230 implements one or more functions, algorithms, or any other suitable logic to determine the maximum rated power based on one or more aircraft and/or engine parameters.

Figure 2D:
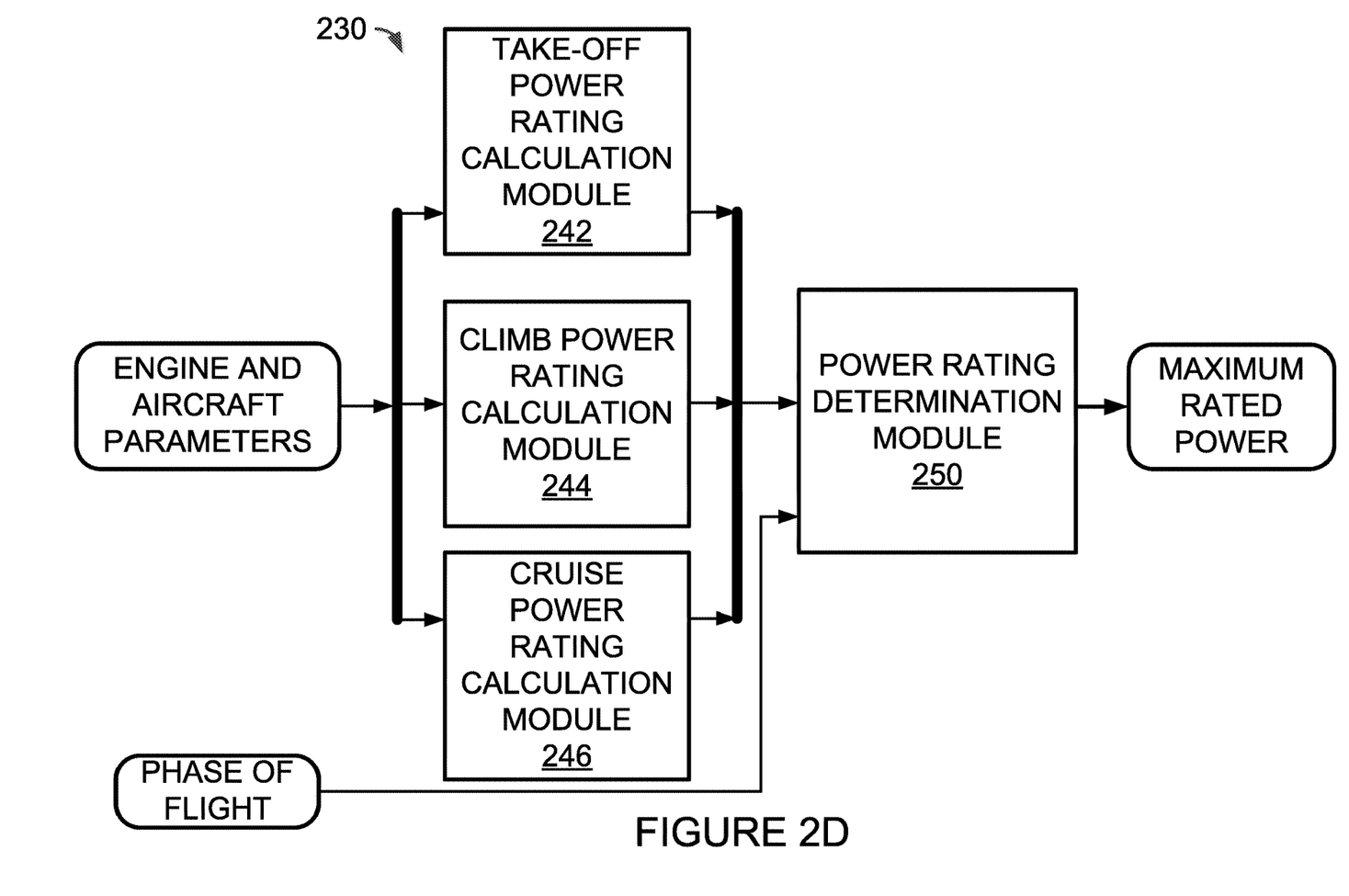
FIG. 2D is a schematic diagram illustrating an example implementation of the power rating calculation module of FIG. 2C, in accordance with one or more embodiments.

With reference to FIG. 2D, in some embodiments, the power rating calculation module 230 determines a plurality of maximum rated powers for different possible phases of flight of the aircraft and determines the maximum rated power for each engine rating from the plurality of maximum rated powers based on the determined phase of flight of the aircraft. In the specific and non-limiting example illustrated in FIG. 2D, a take-off power rating calculation module 242, a climb power rating calculation module 244 and a cruise power rating calculation module 246 are provided. The take-off power rating calculation module 242 determines a maximum rated power for each engine rating for when the phase of flight is take-off, based on one or more aircraft and/or engine parameters. The climb power rating calculation module 244 determines a maximum rated power for each engine rating for when the phase of flight is climb, based on one or more aircraft and/or engine parameters. The cruise power rating calculation module 246 determines a maximum rated power for each engine rating for when the phase of flight is cruise, based on one or more aircraft and/or engine parameters. Each of the power rating calculation modules 242, 244, 246 implements one or more functions, algorithms, or any other suitable logic to determine the maximum rated power for each rating.

The power rating determination module 250 determines the maximum rated power for each engine rating from the plurality of maximum rated powers from the power rating calculation modules 242, 244, 246 using the determined phase of flight of the aircraft. In some embodiments, the power rating determination module 250 may select the maximum rated power corresponding to the determined phase of flight from the plurality of maximum rated powers for each engine rating. For example, if the determined phase of flight is climb, the determination module 250 may select the maximum rated power from the climb power rating calculation module 244 as the maximum rated power to be used for each engine rating. In some embodiments, the power rating determination module 250 may interpolate between at least two of the plurality of maximum rated powers to determine the maximum rated power for each engine rating. For example, if the determined phase of flight is a transition between take-off and climb, the determination module 250 may interpolate between the maximum rated power from the take-off power rating calculation module 242 and the maximum rated power from the climb power rating calculation module 244 to determine the maximum rated power for each rating.

Figure 3A:
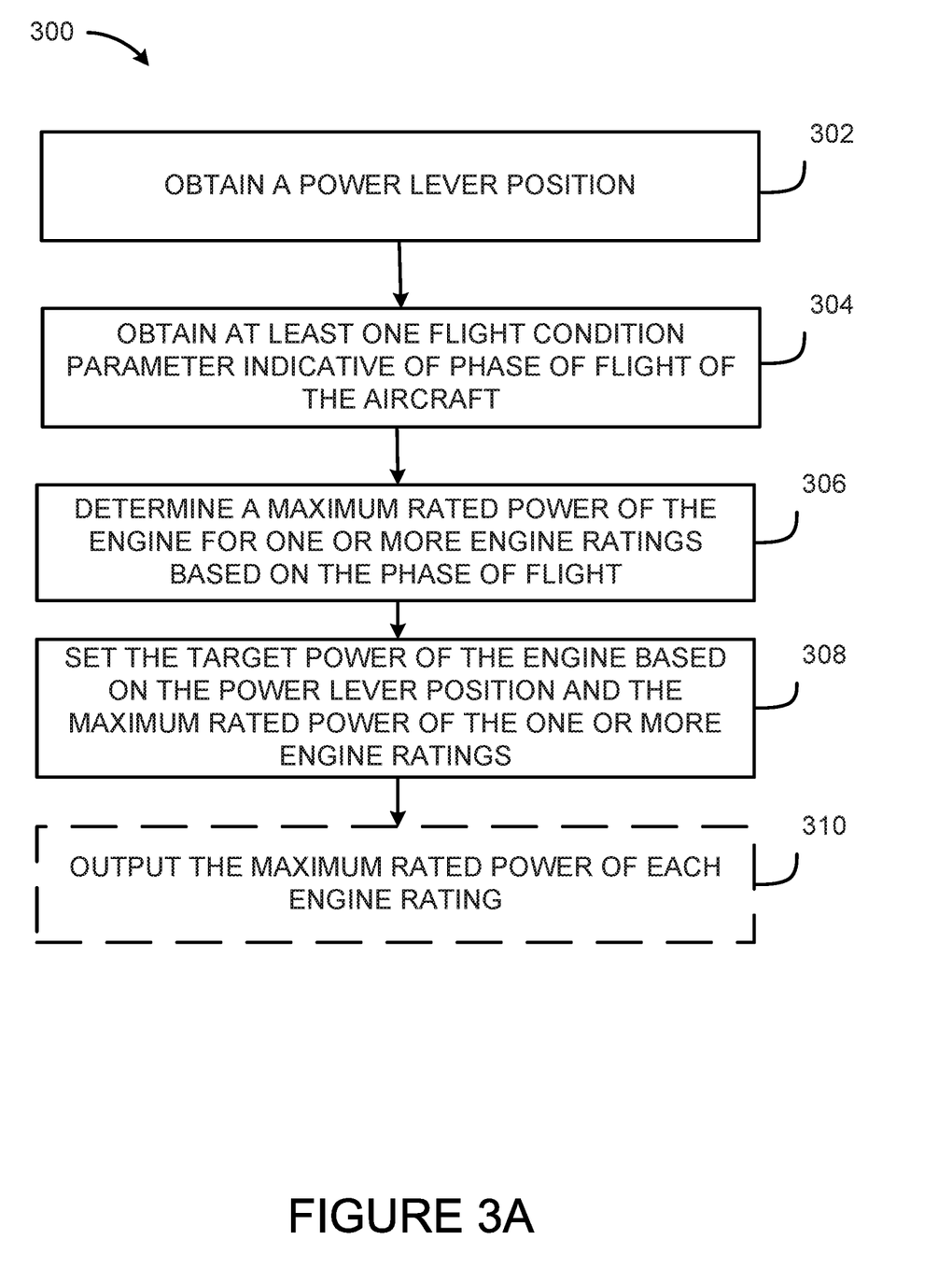
FIG. 3A is a flowchart of a method for setting a target power of an aircraft engine, in accordance with one or more embodiments.

With reference to FIG. 3A, there is illustrated a flowchart of a method 300 for setting a target power of an aircraft engine, such as the engine 10, in accordance with an embodiment. At step 302, a power lever position is obtained. At step 304, at least one flight condition parameter indicative of phase of flight of the aircraft is obtained. The phase of flight of the aircraft can be determined from the flight condition parameter(s). At step 306, a maximum rated power of the engine 10 for one or more engine ratings are determined based on the phase of flight. The maximum rated power of the engine 10 may be determined for one engine rating or for a plurality of engine ratings. The maximum rated power of the engine for the engine rating(s) may be determined based on the phase of flight and one or more engine and/or aircraft parameters. At step 308, the target power of the engine is set based on the power lever position and the maximum rated power of the one or more engine ratings. In some embodiments, at step 310, the maximum rated power of each engine rating is output. For example, the maximum rated power of each engine rating may be output to an aircraft computer for displaying the maximum rated power of each engine rating.

Figure 3B:
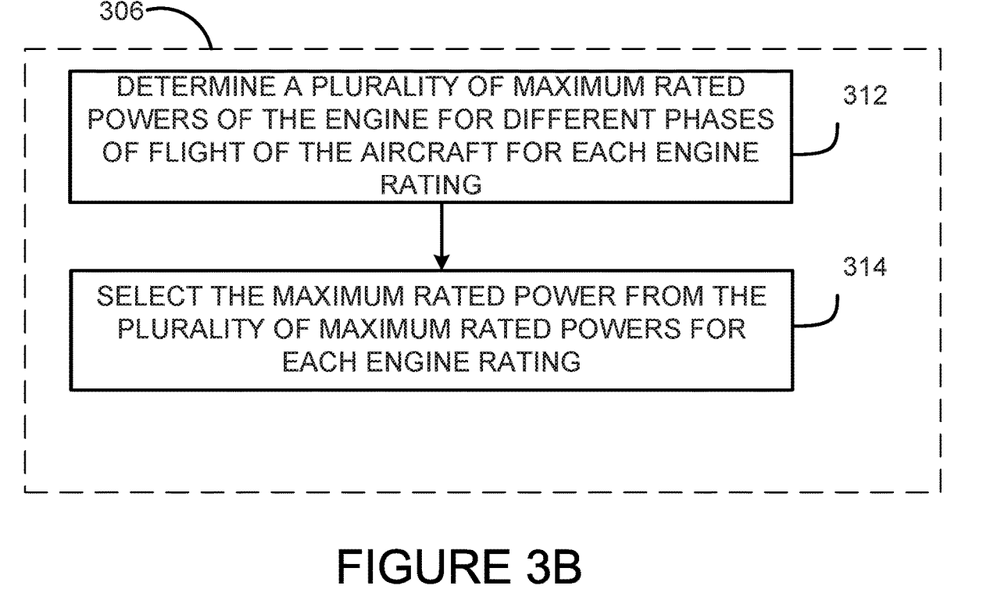
FIGS. 3B and 3C are flowcharts of example embodiments for determining a maximum rated power, in accordance with one or more embodiments.

With reference to FIG. 3B, in some embodiments, step 306 of FIG. 3A comprises determining a plurality of maximum rated powers of the engine 10 for different phases of flight for the aircraft for each engine rating at step 312 and selecting the maximum rated power corresponding to the phase of flight from the plurality of maximum rated powers for each engine rating at step 314. For example, the different phases of flight at step 312 may be take-off, climb and cruise and the phase of flight at step 304 may correspond to one of take-off, climb and cruise.

Figure 3C:
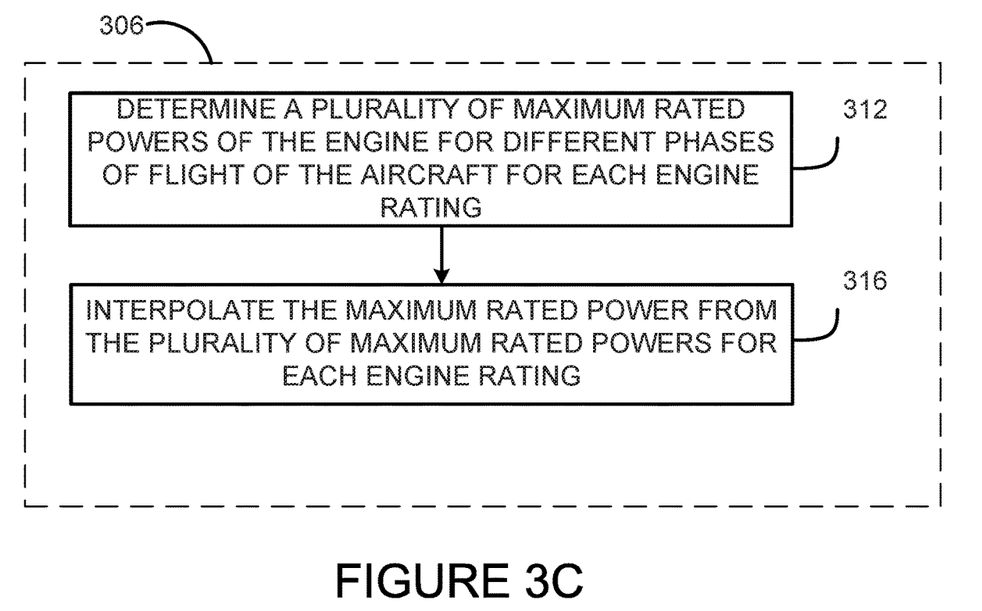

With reference to FIG. 3C, in some embodiments, step 306 of FIG. 3A comprises determining a plurality of maximum rated powers of the engine 10 for different phases of flight for the aircraft for each engine rating at step 312 and interpolating between at least two of the plurality of maximum rated powers of the engine 10 based on the phase of flight to determine the maximum rated power for each engine rating at step 316. For example, the different phases of flight at step 312 may be take-off, climb and cruise and the phase of flight at step 304 may correspond to a transition between two of take-off, climb and cruise.

Figure 3D:
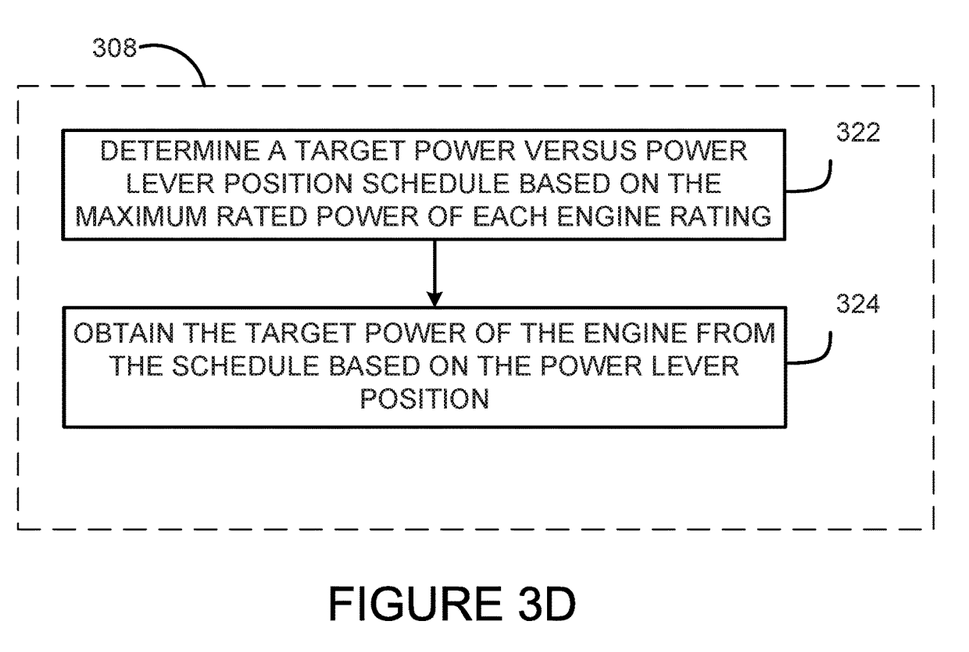
FIG. 3D is a flowchart of an example embodiment for setting the target power, in accordance with one or more embodiments.

With reference to FIG. 3D, in some embodiments, step 308 of FIG. 3A comprises determining a target power versus power lever position schedule based on the maximum rated power of each engine rating at step 322 and obtaining the target power of the engine 10 from the schedule based on the power lever position at step 324.

The systems and methods described herein may allow for a specific engine rating to have different maximum power ratings (i.e., different levels) based on the phase of flight of the aircraft. Accordingly, the systems and/or methods described herein may allow for dynamic setting of the target power of the engine 10 as the phase of flight of the aircraft varies.

The systems and/or methods described herein may be used to set a target thrust of an aircraft engine in a similar manner to the setting of a target power as described herein. For instance, the selected engine rating may correspond to a maximum take-off thrust engine rating, a maximum continuous thrust engine rating, a maximum cruise thrust engine rating or any other suitable engine rating. A maximum rated thrust of one or more engine ratings may be determined based on the phase of flight. For example, the maximum rated thrust of the engine rating(s) may be determined based on the phase of flight and one or more aircraft and/or engine parameters. The maximum rated thrust of the engine rating(s) may be determined by selecting or interpolating from a determined plurality of maximum rated thrusts of for different phases of flight for each engine rating. A target thrust of the engine may be set based on an obtained thrust lever position and the determined maximum rated thrust of each engine rating. A target thrust versus thrust lever position schedule may be determined based on the maximum rated thrust of each engine rating. The target thrust of the engine may be obtained from the schedule based on the thrust lever position.

Figure 4:
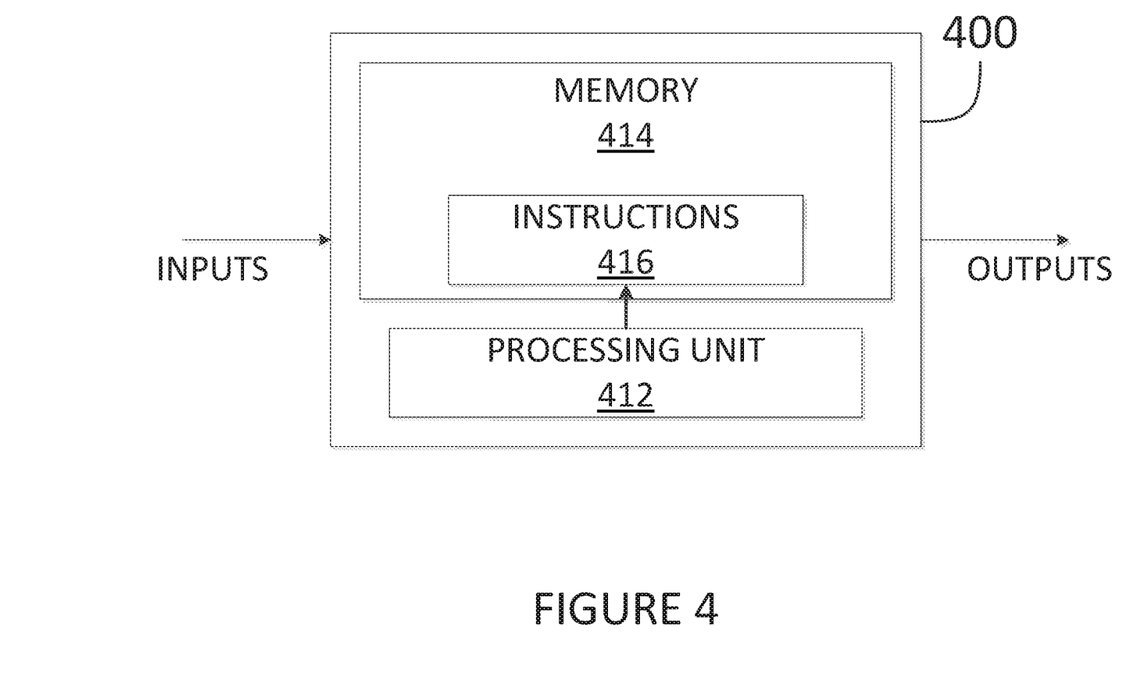
FIG. 4 is a block diagram of an example computing device for implementing the systems and methods described herein, in accordance with one or more embodiments.

With reference to FIG. 4, an example of a computing device 400 is illustrated. The controller 210 may be implemented using the computing device 400. The computing device 400 comprises a processing unit 412 and a memory 414 which has stored therein computer-executable instructions 416. The processing unit 412 may comprise any suitable devices configured to implement the method 300 such that instructions 416, when executed by the computing device 400 or other programmable apparatus, may cause the functions/acts/steps performed as part of the method 300 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. Note that the computing device 400 can be implemented as part of a full-authority digital engine control (FADEC) or other similar device, including electronic engine control (EEC), engine control unit (ECU), and the like.

The methods and systems for setting a target power or thrust of an aircraft engine described herein may be implemented in a high level procedural or object oriented programming or scripting language, or a combination thereof, to communicate with or assist in the operation of a computer system, for example the computing device 400. Alternatively, the methods and systems for setting a target power or thrust of an aircraft engine may be implemented in assembly or machine language, The language may be a compiled or interpreted language. Program code for implementing the methods and systems for setting a target power or thrust of an aircraft engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for setting a target power or thrust of an aircraft engine may also be considered to be implemented by way of a non-transitory computer-readable storage medium having a computer program stored thereon. The computer program may comprise computer-readable instructions which cause a computer, or more specifically the processing unit 412 of the computing device 400, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed, Still other modifications which fall within the scope of the present invention will be apparent to those skilled in the art, in light of a review of this disclosure.

Various aspects of the methods and systems for setting a target power or thrust of an aircraft engine may be used alone, in combination, or in a variety of arrangements not specifically discussed in the embodiments described in the foregoing and is therefore not limited in its application to the details and arrangement of components set forth in the foregoing description or illustrated in the drawings, For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for setting a target power of an aircraft engine, the method comprising:
    obtaining a power lever position;
    obtaining at least one flight condition parameter indicative of a phase of flight of the aircraft;
    determining a maximum rated power of the engine for one or more engine ratings based on the phase of flight; and
    setting the target power of the engine based on the power lever position and the maximum rated power of the one or more engine ratings, the target power varying with the determined maximum rated power for a given position of a power lever.

2. The method of claim 1, wherein the phase of flight corresponds to one of take-off, climb, go-around, cruise and descent of the aircraft.

3. The method of claim 1, wherein the phase of flight corresponds to a transition between two of take-off, climb, go-around, cruise and descent of the aircraft.

4. The method of claim 1, wherein the at least one flight condition parameter comprises at least one of altitude, speed, rate of climb, acceleration, pitch angle, roll angle and yaw angle of the aircraft.

5. The method of claim 1, wherein the one or more engine ratings correspond to one or more of a maximum take-off power engine rating, a maximum continuous power engine rating, a maximum climb power engine rating, a maximum cruise power engine rating, a normal take-off power engine rating, a normal climb power engine rating, and a normal cruise power engine rating.

6. The method of claim 1, wherein determining the maximum rated power for the one or more engine ratings comprises determining the maximum rated power for each engine rating based on the phase of flight and one or more of an aircraft altitude, an aircraft speed, an air temperature, an engine rotational speed, an engine bleed and an engine power extraction.

7. The method of claim 1, wherein determining the maximum rated power for the one or more engine ratings comprises:
    determining a plurality of maximum rated powers for different phases of flight of the aircraft for each engine rating; and
    selecting the maximum rated power corresponding to the phase of flight from the plurality of maximum rated powers for each engine rating.

8. The method of claim 1, wherein determining the maximum rated power for the one or more engine ratings comprises:
    determining a plurality of maximum rated powers of the engine for different phases of flight of the aircraft for each engine rating; and
    interpolating between at least two of the plurality of maximum rated powers based on the phase of flight to determine the maximum rated power for each engine rating.

9. The method of claim 1, wherein setting the target power of the engine comprises:
    determining a target power versus power lever position schedule based on the maximum rated power of the one or more engine ratings; and
    obtaining the target power of the engine from the schedule based on the power lever position.

10. The method of claim 1, further comprising outputting the maximum rated power for each engine rating to an aircraft computer for displaying of the maximum rated power of each engine rating.

11. A system for setting a target power of an aircraft engine, the system comprising:
    at least one processing unit; and
    at least one non-transitory computer-readable memory having stored thereon program instructions executable by the at least one processing unit for:
        obtaining a power lever position;
        obtaining at least one flight condition parameter indicative of a phase of flight of the aircraft;
        determining a maximum rated power of the engine for one or more engine ratings based on the phase of flight; and setting the target power of the engine based on the power lever position and the maximum rated power of the one or more engine ratings, the target power varying with the determined maximum rated power for a given position of a power lever.

12. The system of claim 11, wherein the phase of flight corresponds to one of take-off, climb, go-around, cruise and descent of the aircraft.

13. The system of claim 11, wherein the phase of flight corresponds to a transition between two of take-off, climb, go-around, cruise and descent of the aircraft.

14. The system of claim 11, wherein the at least one flight condition parameter comprises at least one of altitude, speed, rate of climb, acceleration, pitch angle, roll angle and yaw angle of the aircraft.

15. The system of claim 11, wherein the one or more engine ratings correspond to one or more of a maximum take-off power engine rating, a maximum continuous power engine rating, a maximum climb power engine rating, a maximum cruise power engine rating, a normal take-off power engine rating, a normal climb power engine rating, a normal cruise power engine rating, or any other rating.

16. The system of claim 11, wherein determining the maximum rated power for the one or more engine ratings comprises determining the maximum rated power for each engine rating based on the phase of flight and one or more of an aircraft altitude, an aircraft speed, an air temperature, an engine rotational speed, an engine bleed and an engine power extraction.

17. The system of claim 11, wherein determining the maximum rated power for the one or more engine ratings comprises:
  determining a plurality of maximum rated powers for different phases of flight of the aircraft for each engine rating; and
  selecting the maximum rated power corresponding to the phase of flight from the plurality of maximum rated powers of each engine rating for each engine rating.

18. The system of claim 11, wherein determining the maximum rated power of each engine rating comprises:
  determining a plurality of maximum rated powers of the engine for different phases of flight of the aircraft for each engine rating; and
  interpolating between at least two of the plurality of maximum rated powers based on the phase of flight to determine the maximum rated power for each engine rating.

19. The system of claim 11, wherein setting the target power of the one or more engine ratings comprises:
  determining a target power versus power lever position schedule based on the maximum rated power of the one or more engine ratings; and
  obtaining the target power of the engine from the schedule based on the power lever position.

20. The system of claim 11, where the program instructions are further executable by the at least one processing unit for outputting the maximum rated power for each engine rating to an aircraft computer for displaying of the maximum rated power for each engine rating.

\* \* \* \* \*